United States Patent [15] 3,675,160
Staker [45] July 4, 1972

[54] POTENTIAL CONTROLLED OSCILLATOR

[72] Inventor: William C. Staker, Springfield, Ohio

[73] Assignee: General Motors Corporation, Detroit, Mich.

[22] Filed: Aug. 31, 1970

[21] Appl. No.: 68,068

[52] U.S. Cl. ....................331/113 R, 331/144
[51] Int. Cl. ....................H03k 3/282
[58] Field of Search ....................331/113, 144, 145

[56] References Cited

UNITED STATES PATENTS

| | | | |
|---|---|---|---|
| 3,264,579 | 8/1966 | Marcus | 331/113 |
| 3,334,315 | 8/1967 | Stratton | 331/113 |

OTHER PUBLICATIONS

Electronics, F. B. Golden, Pg. 82, Nov. 25, 1968,

*Primary Examiner*—John Kominski
*Attorney*—Eugene W. Christen, Creighton R. Meland and Richard G. Stahr

[57] ABSTRACT

A potential controlled oscillator including two transistors interconnected for alternate conduction, each corresponding to a respective timing capacitor, having the current carrying electrodes thereof connected in parallel across the output terminals of a direct current potential source. Each timing capacitor is charged in a first direction by the direct current potential source through the base-emitter electrodes of the corresponding transistor when conductive and in a second direction by a selectively variable direct current control potential through a constant current circuit responsive to the magnitude of the selectively variable direct current control potential for varying the magnitude of charge current and the collector-emitter electrodes of the other transistor when conductive. When either timing capacitor has become charged in the second direction, the selectively variable direct current control potential, applied across the base-emitter electrodes of the corresponding transistor, triggers the corresponding transistor conductive. Upon the triggering of either one of the transistors conductive, the other timing capacitor, charged in the first direction, discharges therethrough in an inverse polarity relationship across the base-emitter electrodes of the corresponding transistor to quickly extinguish the corresponding transistor and begins to charge therethrough in the second direction.

6 Claims, 1 Drawing Figure

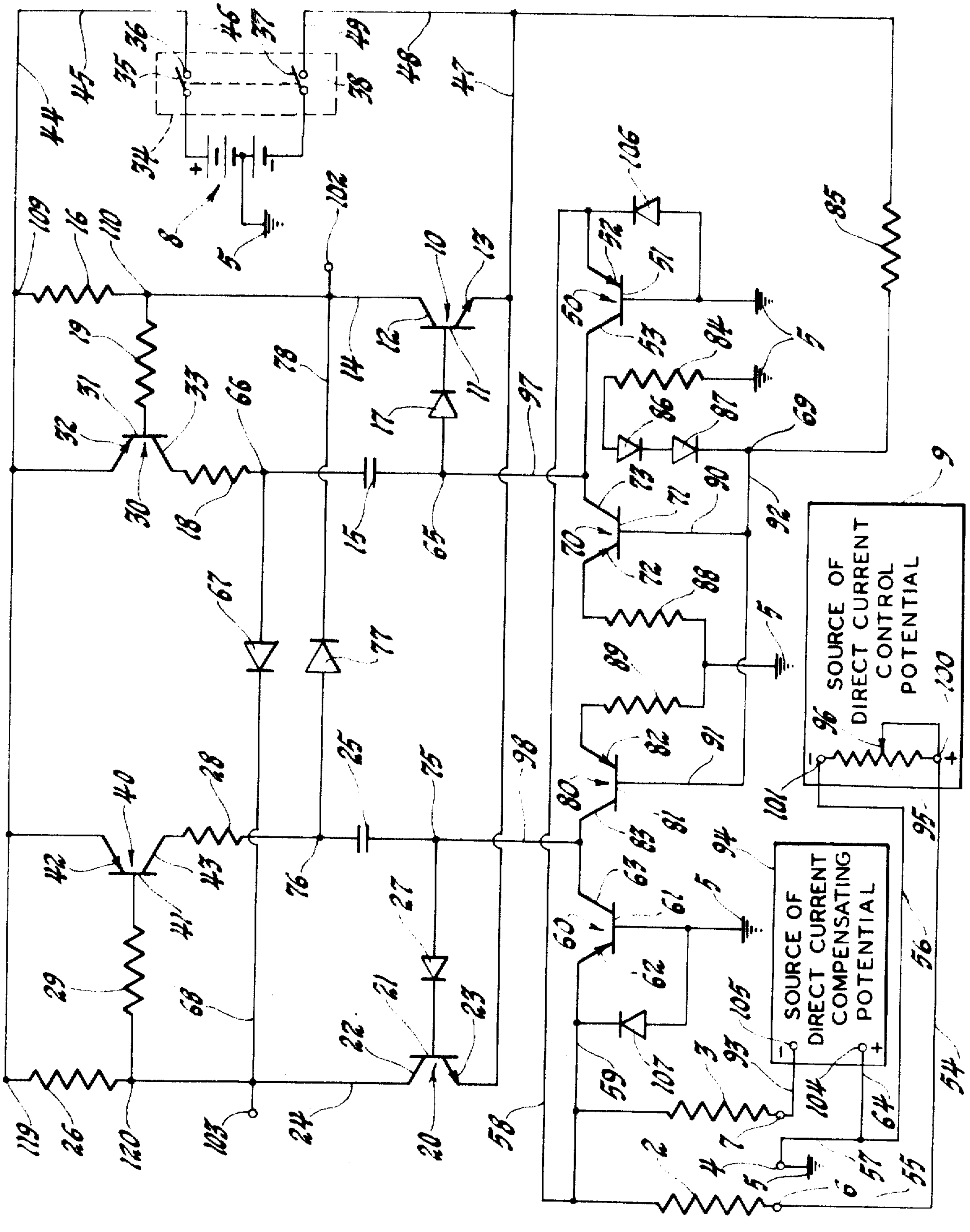
INVENTOR.
William C. Staker
BY
Richard G. Staker
ATTORNEY

POTENTIAL CONTROLLED OSCILLATOR

This invention is directed to oscillator circuits and, more specifically, to a potential controlled oscillator circuit which is responsive to changes of magnitude of a selectively variable direct current control potential to produce an output frequency which changes linearly with changes of magnitude of the control potential.

With many applications, it is desirable to employ an oscillator circuit which will produce an output frequency which varies linearly in response to the magnitude of a control potential.

It is, therefore, an object of this invention to provide an improved potential controlled oscillator circuit.

It is another object of this invention to provide an improved potential controlled oscillator circuit of the type which will provide an output frequency which varies linearly in response to the magnitude of a selectively variable control potential.

It is another object of this invention to provide an improved potential controlled oscillator circuit which is responsive to changes of magnitude of a selectively variable control potential to produce an output frequency which varies linearly with changes of magnitude of a selectively variable control potential to produce an output frequency which varies linearly with changes of magnitude of the control potential and to changes of magnitude of a compensating potential to correct for any frequency drift or to change the output frequency as determined by changes of demand with any selected control potential magnitude.

In accordance with this invention, a potential controlled oscillator circuit is provided wherein each of two timing capacitors is charged in a first direction through the base-emitter electrodes of a corresponding one of two transistors, interconnected across a direct current potential source for alternate conduction, while conducting and in a second opposite direction through a constant current circuit, responsive to the magnitude of a selectively variable direct current control potential for varying the magnitude of charge current, and the collector-emitter electrodes of the other transistor while conducting, each transistor being triggered conductive when the timing capacitor to which it corresponds has been charged in the second direction to establish a discharge circuit for the other timing capacitor in an inverse polarity relationship across the base-emitter electrodes of the corresponding transistor to extinguish the corresponding transistor and a charge circuit in the second direction for the other timing capacitor.

For a better understanding of the present invention, together with additional objects, advantages and features thereof, reference is made to the following description and accompanying single FIGURE drawing which sets forth the potential controlled oscillator circuit of this invention in schematic form.

In the FIGURE, the point of reference or ground potential has been represented by the accepted schematic symbol and referenced by the numeral 5.

Referring to the FIGURE, the novel potential controlled oscillator circuit of this invention is set forth in a schematic form in combination with a direct current potential source 8 of the type having positive and negative polarity output terminals with respect to point of reference potential 5 and a source of selectively variable direct current control potential 9 and includes first and second timing capacitors 15 and 25; first and second alternately conductive transistors 10 and 20, each corresponding to a respective one of timing capacitors 15 and 25 and each having two current carrying electrodes connected across the direct current potential source 8 and a control electrode; a first charge circuit for each one of timing capacitors 15 and 25 for charging the respective one of timing capacitors 15 and 25 in a first direction across direct current potential source 8 while the corresponding one of transistors 10 and 20 is conducting through the current carrying electrodes thereof; a second charge circuit for each one of timing capacitors 15 and 25 for charging the respective one of timing capacitors 15 and 25 in a second opposite direction across the source of selectively variable direct current control potential 9 while the other one of transistors 10 and 20 is conducting through the current carrying electrodes thereof; a first constant current circuit included in each one of the second charge circuits, respective transistors 50 and 60 and the associated circuitry, for varying the magnitude of the charge current of the respective one of timing capacitors 15 or 25 in response to changes of magnitude of the selectively variable direct current control potential; circuitry for applying at least a portion of the selectively variable direct current control potential in a forward polarity relationship across the control electrode and a selected one of the current carrying electrodes of the one of transistors 10 and 20 which corresponds to the timing capacitor 15 or 25 being charged in the second direction when the timing capacitor has become charged; circuitry for applying the first direction charge upon each one of timing capacitors 15 and 25 in an inverse polarity relationship across the control electrode and a selected one of the current carrying electrodes of the corresponding one of transistors 10 and 20 when the other one of transistors 10 and 20 conducts through the current carrying electrodes thereof and a second constant current circuit, respective transistors 70 and 80 and the associated circuitry, connected in parallel with each one of the first constant current circuits for establishing a minimum output frequency.

In the FIGURE, and without intention or inference of a limitation thereto, transistors 10 and 20, which correspond to respective timing capacitors 15 and 25, are illustrated as type NPN transistors each having two current carrying electrodes, respective collector electrodes 12 and 22 and respective emitter electrodes 13 and 23, and a control electrode, respective base electrodes 11 and 21.

The current carrying electrodes of transistors 10 and 20, the respective collector-emitter electrodes, are, upon the closure of movable contacts 35 and 37 of double pole-single throw switch 34 to respective stationary contacts 36 and 38 thereof, connected in parallel across the output terminals of direct current potential source 8. The respective collector electrodes 12 and 22 of type NPN transistors 10 and 20 are connected to the positive polarity terminal of direct current potential source 8 through respective leads 14 and 24, respective collector resistors 16 and 26, leads 44, 45, and 46 and stationary contact 36 and movable contact 35 of switch 34 and the respective emitter electrodes 13 and 23 are connected to the negative polarity terminal of direct current potential source 8 through leads 47, 48 and 49 and stationary contact 38 and movable contact 37 of switch 34. Consequently, the collector-emitter electrodes of type NPN transistors 10 and 20 are properly poled for forward collector-emitter conduction therethrough. In a manner to be explained in detail later in this specification, transistors 10 and 20 are alternately conductive through the current carrying electrodes thereof.

Each of timing capacitors 15 and 25 charges in a first direction through a respective first charge circuit across direct current potential source 8, to be later described, while the corresponding one of transistors 10 or 20 is conducting through the current carrying electrodes thereof and in a second opposite direction through a respective second charge circuit across source of selectively variable direct current control potential 9, to be later described, while the other one of transistors 10 or 20 is conducting through the current carrying electrodes thereof.

To establish the first charge circuit for each of timing capacitors 15 and 25 while the corresponding one of transistors 10 or 20 is conducting through the current carrying electrodes thereof and to interrupt the first charge circuit for each one of timing capacitors 15 and 25 while the other one of transistors 10 or 20 is conducting through the current carrying electrodes thereof, the current carrying electrodes of a respective type PNP transistor is included in the first charge circuit of each timing capacitors 15 and 25. These type PNP transistors are referenced by the numerals 30 and 40 in the FIGURE and each has two current carrying electrodes, respective emitter electrodes 32 and 42 and respective collector electrodes 33 and 43, and a control electrode, respective base electrodes 31 and 41.

To provide a first charge circuit for each one of timing capacitors 15 and 25, each series combination of the current carrying electrodes of one of transistors 30 or 40, one of timing capacitors 15 or 25 and the control electrode and a selected one of the current carrying electrodes of the corresponding one of transistors 10 or 20 is connected in parallel across direct current potential source 8. That is, the series combination of the emitter-collector electrodes of transistor 30, timing capacitor 15 and the base-emitter electrodes of corresponding transistor 10, in that order, and the series combination of the emitter-collector electrodes of transistor 40, timing capacitor 25, and the base-emitter electrodes of corresponding transistor 20, in that order, are, upon the closure of switch 34, connected across the output terminals of direct current potential source 8 through leads 44, 45, and 46 and stationary contact 36 and movable contact 35 of switch 34 which connects the respective emitter electrodes 32 and 42 of transistors 30 and 40 to the positive polarity terminal of direct current potential source 8 and through leads 47, 48 and 49 and stationary contact 38 and movable contact 37 of switch 34 which connects the respective emitter electrodes 13 and 23 of transistors 10 and 20 to the negative polarity terminal of direct current potential source 8.

In a manner to be explained in detail later in this specification, the output frequency of the novel potential controlled oscillator circuit of this invention is determined by the magnitude of charge current of timing capacitors 15 and 25 in the second direction through each respective second charge circuit across source of selectively variable direct current control potential 9. As is well known in the art, the potential of a capacitor charged across a direct current potential source through a constant current circuit increases linearly in magnitude. Consequently, to provide for a linear change of output frequency with changes of direct current control potential magnitude, each second charge circuit for timing capacitors 15 and 25 includes a constant current circuit for varying the magnitude of the charge current of timing capacitors 15 or 25 in the second direction in response to changes of magnitude of the selectively variable direct current control potential. It is also well known in the art that with a forward bias potential of a specific magnitude across the base-emitter junction of a transistor, a substantially constant current will flow through the collector-emitter electrodes of a magnitude determined by the magnitude of the bias potential and circuit impedance and that with an increase or decrease of magnitude of this forward bias potential, the constant current flow through the collector-emitter electrodes will increase or decrease in magnitude, respectively. In the potential controlled oscillator circuit of this invention, the constant current circuit included in each of the second charge circuits for varying the magnitude of the charge current in the second direction of the respective one of the timing capacitors in response to changes of magnitude of the selectively variable direct current control potential may be respective type PNP transistors 50 and 60, each having two current carrying electrodes, respective emitter electrodes 52 and 62 and respective collector electrodes 53 and 63, and a control electrode, respective base electrodes 51 and 61, and the associated circuitry.

The selectively variable direct current control potential may be applied to the potential controlled oscillator circuit of this invention through an input circuit including input resistor 2 and point of reference potential 5. To facilitate electrical connections to external circuitry and without intention or inference of a limitation thereto, a common input circuit terminal 4 may be connected to point of reference potential 5 and an input circuit terminal 6, across which and common input circuit terminal 4 the source of selectively variable direct current control potential 9 may be connected, may be connected to one end of input resistor 2. The positive and negative polarity output terminals 100 and 101, respectively, of source of selectively variable direct current control potential 9 may be connected across the input circuit through leads 54 and 55 and input circuit terminal 6 and through leads 56 and 57 and common input circuit terminal 4, respectively.

To provide a second charge circuit for each one of timing capacitors 15 and 25, the series combination of the emitter-collector electrodes of transistor 50, timing capacitor 15 and the collector-emitter electrodes of transistor 20 and the series combination of the emitter-collector electrodes of transistor 60, timing capacitor 25 and the collector-emitter electrodes of transistor 10 are connected across the input circuit through respective leads 58 and 59 which connects emitter electrodes 52 and 62 of respective transistors 50 and 60 to one end of input resistor 2 and, upon the closure of switch 34, through leads 47, 48 and 49, stationary contact 38 and movable contact 37 of switch 34 and that portion of source of direct current potential 8 between the negative polarity terminal thereof and point of reference potential 5 which connects emitter electrodes 13 and 23 of respective transistors 10 and 20 to point of reference potential 5. The emitter electrodes 52 and 62 and the base electrodes 51 and 61 of respective type PNP transistors 50 and 60 are connected across the input circuit through respective leads 58 and 59 which connect the emitter electrodes 52 and 62 of respective transistors 50 and 60 to one end of input resistor 2 and through point of reference potential 5 to which the base electrodes 51 and 61 of respective transistors 50 and 60 are connected. As both transistors 50 and 60 are of the PNP type and since the emitter-base electrodes of both are connected to the positive and negative polarity output terminals 100 and 101, respectively, of source of selectively variable direct current control potential 9 through input resistor 2, input terminal 6 and leads 55 and 54 and through point of reference potential 5, common input terminal 4 and leads 57 and 56, respectively the selectively variable direct current control potential is applied across the emitter-base electrodes of these two transistors in the proper polarity relationship to produce emitter-base current flow and, consequently, emitter-collector current flow therethrough.

The selectively variable direct current control potential, therefore, is applied across each series combination of the current carrying electrodes of one of transistors 50 or 60, one of timing capacitors 15 or 25 and the current carrying electrodes of the other one of transistors 10 and 20 for charging the respective one of timing capacitors 15 and 25 in a second direction while the other one of transistors 10 or 20 is conducting through the current carrying electrodes thereof and in a forward polarity relationship across the control electrode and a selected one of the current carrying electrodes of both transistors 50 and 60 in parallel for varying the magnitude of the charge current in the second direction of the respective one of the timing capacitors in response to changes of magnitude thereof through the input circuit.

To apply at least a portion of the selectively variable direct current control potential in a forward polarity relationship across the control electrode and a selected one of the current carrying electrodes of the one of transistors 10 and 20 which corresponds to the timing capacitor 15 or 25 being charged in the second direction when the timing capacitor 15 or 25 has become charged, the base electrode 11 of transistor 10 is connected through diode 17 to junction 65 between timing capacitor 15 to which it corresponds and the current carrying electrodes of transistor 50 with which timing capacitor 15 is connected in series and the base electrode 21 transistor 20 is connected through diode 27 to junction 75 between timing capacitor 25 to which it corresponds and the current carrying electrodes of transistor 60 with which timing capacitor 25 is connected in series. The operation of this circuitry will be explained in detail later in this specification.

The first direction charge upon timing capacitor 15 is applied in a reverse polarity relationship across the control electrode and a selected one of the current carrying electrodes of the corresponding transistor 10, the base-emitter electrodes, when the other one of transistors 10 and 20, transistor 20, conducts through the current carrying electrodes thereof through a circuit which may be traced from the plate of timing capacitor 15 connected to junction 66, through diode 67, lead 68, lead 24, the collector-emitter electrodes of transistor 20 and lead 47. The first direction charge upon timing capacitor 25 is applied in a reverse polarity relationship across the control electrode and a selected one of the current carrying electrodes of the corresponding one of transistors 10 and 20, the base-emitter electrodes of transistor 20, when the other one of transistors 10 and 20, transistor 10, conducts through the current carrying electrodes thereof through a circuit which may be traced from the plate of capacitor 25 connected to junction 76, through diode 77, lead 78, lead 14, the collector-emitter electrodes of transistor 10 and lead 47. Diodes 17 and 27 prevent respective timing capacitors 15 and 25 from discharging through the emitter-base junction of the corresponding transistors 10 and 20 in an inverse polarity relationship to prevent the destruction of these devices.

To establish a minimum output frequency, a constant current circuit is connected in parallel with each constant current circuit of the second charge circuits. These constant current circuits may be type PNP transistors 70 and 80 each having two current carrying electrodes, respective emitter electrodes 72 and 82 and collector electrodes 73 and 83, and a control electrode, respective base electrodes 71 and 81, and the associated circuitry.

To produce a constant bias potential for transistors 70 and 80, resistor 84 and resistor 85 are connected in series across the point of reference potential 5 and the negative polarity terminal of direct current potential source 8 through lead 48 and stationary contact 38 and movable contact 37 of switch 34 upon the closure of switch 34. The current flow through this voltage divider upon the closure of switch 34 produces a potential drop across resistor 84 which is of a negative polarity upon point 69 with respect to the point of reference potential 5. Diodes 86 and 87 may be connected in series between resistor 84 and point 69 for the purpose of temperature compensation. That is, as the resistance value of resistor 84 increases as a result of the heat produced by the flow of current therethrough, the potential drop across series diodes 86 and 87 decreases by an equal amount to maintain the difference potential across point of reference potential 5 and point 69 substantially constant. This constant potential serves as the constant bias potential for the emitter-base electrodes of transistors 70 and 80.

The constant bias potential which appears across resistor 84 is applied in a forward polarity relationship across the control electrode and a selected one of the current carrying electrodes of transistors 70 and 80 in parallel through respective parallel emitter resistors 88 and 89, through which respective emitter electrodes 72 and 82 are connected to point of reference potential 5, and through respective parallel leads 90 and 91 and lead 92 which connect respective base electrodes 71 and 81 to point 69 between series resistors 84 and 85. As the potential upon point 69, to which base electrodes 71 and 81 are connected, is of a negative polarity with respect to point of reference potential 5, to which emitter electrodes 72 and 82 are connected, the constant bias potential is applied across the emitter base electrodes of both type PNP transistors 70 and 80 in the proper polarity relationship to produce emitter-base current flow therethrough. As this bias potential is constant, a constant emitter-base current flows through both of transistors 70 and 80 of a magnitude determined by the potential difference across point 69 and point of reference potential 5.

To connect each second constant current circuit in parallel with a respective one of the first constant current circuits, respective collector electrodes 73 and 83 of transistors 70 and 80 are connected to respective collector electrodes 53 and 63 of transistors 50 and 60. Consequently, the emitter-collector electrodes of transistor 70 are connected in parallel with the emitter-collector electrodes of transistor 50 through a circuit which may be traced from point of reference or ground potential 5, through resistor 88 and the emitter-collector electrodes of transistor 70 and the emitter-collector electrodes of transistor 80 are connected in parallel with the emitter-collector electrodes of transistor 60 through a circuit which may be traced from point of reference potential 5, through resistor 89 and the emitter-collector electrodes of transistor 80.

If desired, the novel potential controlled oscillator circuit of this invention is also responsive to a direct current compensating potential to correct for any frequency drift which may occur with temperature changes or to change the output frequency as determined by changes of demand with a constant direct current control potential magnitude. That is, with any selected direct current control potential magnitude, should the output frequency change because of a change of circuit parameter value with changes of temperature or should the external demand require a change of output frequency, the magnitude of the direct current compensating potential should change in a direction to maintain a constant output frequency or in a direction to change the output frequency to satisfy the external demand. Consequently, to increase output frequency, the direct current compensating potential is applied to the oscillator circuit of this invention in a polarity relationship to increase the charging current of timing capacitors 15 and 25 in the second direction and to reduce output frequency, the direct current compensating potential is applied to the circuit of this invention in a polarity relationship to reduce the charging current of timing capacitors 15 and 25 in the second direction.

The direct current compensating potential, indicated in block form and referenced by the numeral 94 in the FIGURE, may be applied to the oscillator circuit of this invention through an input circuit including input resistor 3 and point of reference potential 5. To facilitate electrical connections to external circuitry and without intention or inference of a limitation thereto, an input circuit terminal 7, across which and common input circuit terminal 4 a source of direct current compensating potential may be connected, may be connected to one end of input resistor 3. The positive and negative polarity output terminals, 104 and 105, respectively, of a source of direct current compensating potential may be connected across this input circuit through leads 64 and 57 and common input terminal 4 and through lead 93 and input terminal 7, respectively.

As the source of direct current control potential 9 may be any source of direct current potential well known in the art, it has been indicated in the FIGURE in block form with a potentiometer 95 having movable contact 96 connected across the positive and negative polarity output terminals thereof to indicate this source to be selectively variable by operating movable contact 96.

The source of direct current compensating potential 94 may be a frequency to voltage converter circuit well known in the art which is responsive to output frequency to produce a direct current potential proportional to output frequency or it may be an arrangement well known in the art for producing a direct current potential which varies in magnitude with changes of external demand. Consequently, it has been shown in block form in the FIGURE.

With movable contact 96 of potentiometer 95 of source of selectively variable direct current control potential 9 adjusted to apply a direct current control potential across the input circuit, previously described, of a sufficient magnitude to overcome the emitter base barrier of both transistors 50 and 60, emitter-base current flows through both transistors 50 and 60 from the positive polarity output terminal 100 of source of direct current control potential 9, through leads 54 and 55, input terminal 6, input resistor 2, the parallel combination of leads 58 and 59 and the emitter-base electrodes of transistors 50 and 60, point of reference potential 5, common input terminal 4 and leads 57 and 56 to the negative polarity output terminal 101 of source of direct current control potential 9. Consequently, upon the closure of movable contacts 35 and 37 of switch 34 to respective stationary contacts 36 and 38, both transistors 50 and 60 are conditioned for conduction through the emitter-collector electrodes from the positive polarity output terminal 100 of source of direct current control potential 9; through leads 54 and 55; input terminal 6; input resistor 2; the parallel combination of leads 58 and 59, the emitter-collector electrodes of transistors 50 and 60, respective leads 97 and 98, diodes 17 and 27 and the base-emitter electrodes of transistors 10 and 20; leads 47, 48, and 49; stationary contact 38 and movable contact 37 of switch 34; that portion of direct current potential source 8 between the negative polarity terminal and point of reference or ground potential 5; common input terminal 4 and leads 57 and 56 to the negative polarity output terminal 101 of source of direct current control potential 9. As the base-emitter breakdown characteristics of any two transistors are not precisely the same, one or the other of transistors 10 and 20 will conduct first through the base-emitter electrodes. For purposes of this specification, it will be assumed that transistor 10 conducts first through the base-emitter electrodes from the positive polarity output terminal 100 of source of direct current control potential 9 through leads 54 and 55, input terminal 6, input resistor 2, lead 58, the emitter-collector electrodes of transistor 50, lead 97, diode 17, the base-emitter electrodes of transistor 10, leads 47, 48 and 49, stationary contact 38 and movable contact 37 of switch 34, that portion of direct current potential source 8 between the negative polarity terminal and point of reference or ground potential 5, common input terminal 4 and leads 57 and 56 to the negative polarity output terminal 101 of source of direct current control potential 9.

This flow of base-emitter current initiates collector-emitter current flow through forward poled type NPN transistor 10 from the positive polarity terminal of direct current potential source 8, through movable contact 35 and stationary contact 36 of switch 34, leads 46, 45, and 44, collector resistor 16, lead 14, the collector-emitter electrodes of transistor 10, leads 47, 48 and 49 and stationary contact 38 and movable contact 37 of switch 34 to the negative polarity terminal of direct current potential source 8.

Upon the conduction of transistor 10 through the collector-emitter electrodes thereof, the circuit for applying the first direction charge upon timing capacitor 25 in an inverse polarity relationship across the emitter-base electrodes of corresponding transistor 20, the second charge circuit for charging timing capacitor 25 in the second direction across source of direct current control potential 9 and the circuit through which current flows through collector resistor 16 are established and base electrode 21 of transistor 20 is effectively connected to the emitter electrode 23 through timing capacitor 25, diode 77 and leads 78 and 14 and lead 47, a condition which prevents transistor 20 from conducting.

The circuit for applying the charge upon timing capacitor 25 across the emitter-base electrodes of corresponding transistor 20 is of no consequence at this time as timing capacitor 25 is not charged in the first direction.

Timing capacitor 25 begins to charge in the second direction across source of selectively variable direct current control potential 9 through the second charge circuit which may be traced from the positive polarity output terminal 100 of source of direct current control potential 9, through leads 54 and 55, input terminal 6, input resistor 2, lead 59, the emitter-collector electrodes of transistor 60 of the constant current circuit, lead 98, timing capacitor 25, diode 77, leads 78 and 14, the collector-emitter electrodes of the other transistor 10, leads 47, 48 and 49, stationary contact 38 and movable contact 37 of switch 34, that portion of direct current potential source 8 between the negative polarity terminal and point of reference potential 5, common input terminal 4 and leads 57 and 56 to the negative polarity output terminal 101 of source of direct current control potential 9.

The flow of current through collector resistor 16 produces a potential drop thereacross of a positive polarity upon junction 109 with respect to junction 110 which is applied across the emitter-base electrodes of type PNP transistor 30 through lead 44 and base resistor 19, respectively, in the proper polarity relationship to produce emitter-base current flow through a type PNP transistor. This flow of emitter-base current initiates emitter-collector current flow through forward poled type PNP transistor 30 to establish the first charge circuit for timing capacitor 15 for charging timing capacitor 15 in the first direction across direct current potential source 8, consequently, timing capacitor 25 begins to charge in the first direction through the first charge circuit which may be traced from the positive polarity output terminal of direct current potential source 8, through movable contact 35 and stationary contact 36 of switch 34, leads 46, 45 and 44, the emitter-collector electrodes of transistor 30, current limiting resistor 18, timing capacitor 15, diode 17, the base-emitter electrodes of corresponding transistor 10, leads 47, 48 and 49, stationary contact 38 and movable contact 37 to the negative polarity terminal of direct current potential source 8.

When timing capacitor 25 has become charged in the second direction after a period of time as determined by the magnitude of charge current in the second direction which is proportional to the magnitude of the direct current control potential applied across the input circuit, the potential upon junction 75 becomes positive with respect to lead 47. As this potential is applied across the base-emitter electrodes of the corresponding type NPN transistor 20, through diode 27, in the proper polarity relationship to produce base-emitter current flow through a type NPN transistor, base-emitter current flows through transistor 20 from the positive polarity output terminal 100 of source of direct current control potential 9 through leads 54 and 55, input terminal 6, input resistor 2, lead 59, the emitter-collector electrodes of transistor 60, lead 98, diode 27, the base-emitter electrodes of transistor 20, leads 47, 48 and 49, stationary contact 38 and movable contact 37 of switch 34, that portion of direct current potential source 8 between the negative polarity terminal and point of reference or ground potential 5, common input terminal 4 and leads 57 and 56 to the negative polarity output terminal 101 of source of direct current control potential 9.

This flow of base-emitter current initiates collector-emitter current flow through forward poled type NPN transistor 20 from the positive polarity terminal of direct current potential source 8, through movable contact 35 and stationary contact 36 of switch 34, leads 46, 45, and 44, collector resistor 26, lead 24, the collector-emitter electrodes of transistor 20, leads 47, 48 and 49 and stationary contact 38 and movable contact 37 of switch 34 to the negative polarity terminal of direct current potential source 8.

Upon the conduction of transistor 20 through the collector-emitter electrodes thereof, the circuit for applying the first direction charge upon timing capacitor 15 in an inverse polarity relationship across the base-emitter electrodes of corresponding transistor 10, the second charge circuit for charging timing capacitor 15 in the second direction across source of direct current control potential 9 and the circuit through which current flows through collector resistor 26 are established.

The first direction charge upon timing capacitor 15 is applied in an inverse polarity relationship across the emitter-base electrodes of corresponding transistor 10 through a circuit which may be traced from the plate of capacitor 15 connected to junction 66, through diode 67, leads 68 and 14, the collector-emitter electrodes of conducting other transistor 20 and lead 47 to quickly extinguish corresponding transistor 10.

With transistor 10 extinguished, the circuit through which current flows through collector resistor 16 is interrupted, consequently, the emitter and base electrodes of transistor 30 are at substantially the same potential. Therefore, transistor 30 extinguishes to interrupt the first charge circuit for timing capacitor 15 which begins to charge in the second direction across source of direct current control potential 9 through the second charge circuit which may be traced from the positive polarity output terminal 100 of source of direct current control potential 9, through leads 54 and 55, input terminal 6, input resistor 2, lead 58, the emitter-collector electrodes of transistor 50 of the constant current circuit, lead 97, timing capacitor 15, diode 67, lead 68, lead 24, the collector-emitter electrodes of the other transistor 20, leads 47, 48 and 49, stationary contact 38 and movable contact 37 of switch 34, that portion of direct current potential source 8 between the negative polarity terminal and point of reference potential 5, common input terminal 4 and leads 57 and 56 to the negative polarity output terminal 101 of source of direct current control potential 9.

The flow of current through collector resistor 26 produces a potential drop thereacross of a positive polarity upon junction 119 with respect to junction 120 which is applied across the emitter-base electrodes of type PNP transistor 40 through lead 44 and base resistor 29, respectively, in the proper polarity relationship to produce emitter-base current flow through a type PNP transistor. This flow of emitter-base current initiates emitter-collector current flow through forward poled type PNP transistor 40 to establish the first charge circuit for timing capacitor 25 for charging timing capacitor 25 in the first direction across direct current potential source 8, consequently, timing capacitor 25 begins to charge in the first direction through the first charge circuit which may be traced from the positive polarity output terminal of direct current potential source 8, through movable contact 35 and stationary contact 36 of switch 34, leads 46, 45 and 44, the emitter-collector electrodes of transistor 40, current limiting resistor 28, timing capacitor 25, diode 27, the base-emitter electrodes of corresponding transistor 20, leads 47, 48 and 49, stationary contact 38 and movable contact 37 to the negative polarity terminal of direct current potential source 8.

When timing capacitor 15 has become charged in the second direction after a period of time as determined by the magnitude of charge current in the second direction which is proportional to the magnitude of the direct current control potential applied across the input circuit, the potential upon junction 65 becomes positive with respect to lead 47. As this potential is applied across the base-emitter electrodes of the corresponding type NPN transistor 10, through diode 17, in the proper polarity relationship to produce base-emitter current flow through a type NPN transistor, base-emitter current flows through transistor 10 from the positive polarity output terminal 100 of source of direct current control potential 9 through leads 54 and 55, input terminal 6, input resistor 2, lead 58, the emitter-collector electrodes of transistor 50, lead 97, diode 17, the base-emitter electrodes of transistor 10, leads 47, 48 and 49, stationary contact 38 and movable contact 37 of switch 34, that portion of direct current potential source 8 between the negative polarity terminal and point of reference or ground potential 5, common input terminal 4 and lead 47 and 56 to the negative polarity output terminal 101 of source of direct current control potential 9.

This flow of base-emitter current initiates collector-emitter current flow through forward poled type NPN transistor 10 through the circuit previously described to establish the circuit for applying the first direction charge upon timing capacitor 25 in an inverse polarity relationship across the base-emitter electrodes of corresponding transistor 20, the second charge circuit for timing capacitor 25 and the circuit through which current flows through collector resistor 16.

The first direction charge upon timing capacitor 25 is applied in an inverse polarity relationship across the emitter-base electrodes of corresponding transistor 20 through a circuit which may be traced from the plate of capacitor 25 connected to junction 76, through diode 77, leads 78 and 14, the collector-emitter electrodes of conducting other transistor 10 and lead 47 to quickly extinguish corresponding transistor 20.

With transistor 20 extinguished, the circuit through which current flows through collector resistor 26 is interrupted to extinguish transistor 40 to interrupt the first charge circuit for timing capacitor 25 which begins to charge in the second direction through the second charge circuit, previously described, which is established by conducting other transistor 10.

This flow of current through collector resistor 16 again triggers transistor 30 conductive through the emitter-collector electrodes in a manner previously described to establish the first charge circuit, previously described, for timing capacitor 15.

When timing capacitor 25 has become charged in the second direction, the direct current control potential again triggers transistor 20 conductive through the collector-emitter electrodes in a manner previously described to establish the circuit for applying the first direction charge upon timing capacitor 15 in an inverse polarity relationship across the base-emitter electrodes of corresponding transistor 10 to quickly extinguish this device, the second charge circuit for timing capacitor 15 and the circuit through which current flows through collector resistor 26.

The first direction charge upon timing capacitor 15 is applied in an inverse polarity relationship across the emitter-base electrodes of corresponding transistor 10 through the circuit previously described to quickly extinguish corresponding transistor 10.

With transistor 10 extinguished, the circuit through which current flows through collector resistor 16 is interrupted to extinguish transistor 30 to interrupt the first charge circuit for timing capacitor 15 which begins to charge in the second direction through the second charge circuit, previously described, which is established by conducting other transistor 20.

The current flow through collector resistor 26 again triggers transistor 40 conductive through the emitter-collector electrodes in a manner previously described to establish the first charge circuit, previously described, for timing capacitor 25.

When timing capacitor 15 has become charged in the second direction, the direct current control potential again triggers transistor 10 conductive through the collector-emitter electrodes in a manner previously described to establish the circuit for applying the first direction charge upon timing capacitor 25 in an inverse polarity relationship across the base-emitter electrodes of corresponding transistor 20 to quickly extinguish this device, the second charge circuit for timing capacitor 25 and the circuit through which current flows through collector resistor 16

This operation continues so long as switch 34 is closed. The output of the oscillator circuit of this invention may be applied to external circuitry across either or both of output terminals 102 and 103 and point of reference potential 5.

Should movable contact 96 of potentiometer 95 be adjusted in a direction towards the positive polarity output terminal 100 of source of direct current control potential 9 to increase the magnitude of the direct current control potential applied across the input circuitry, the magnitude of emitter-base current flow through transistors 50 and 60 of the constant current circuits increases proportionately. This increase of emitter-base current flow through transistors 50 and 60 increases the magnitude of charge current in the second direction for respective timing capacitors 15 and 25 through the emitter-collector electrodes thereof, consequently, a shorter period of time is required to charge timing capacitors 15 and 25 in the second direction, a condition which increases the output frequency of the oscillator circuit of this invention.

Should movable contact 96 of potentiometer 95 be adjusted in a direction towards the negative polarity output terminal 101 of source of direct current control potential 9 to decrease the magnitude of the direct current control potential applied across the input circuitry, the magnitude of emitter-base current flow through transistors 50 and 60 of the constant current circuits decreases proportionately. This decrease of emitter-base current flow through transistors 50 and 60 decreases the magnitude of charge current in the second direction for respective timing capacitors 15 and 25 through the emitter-collector electrodes thereof, consequently, a longer period of time is required to charge timing capacitors 15 and 25 in the second direction, a condition which decreases the output frequency of the oscillator circuit of this invention.

To establish a minimum output frequency should movable contact 96 of potentiometer 95 be adjusted in a direction toward the negative polarity output terminal 101 of source of direct current control potential 9 to a point at which the magnitude of direct current control potential applied across the input circuit is insufficient to overcome the emitter-base barriers of transistors 50 and 60 or should the direct current potential be removed from across the input circuit, a second constant current circuit comprising type PNP transistors 70 and 80 and the associated circuitry is connected in parallel with each of transistors 50 and 60, as previously described.

With switch 34 closed, a circuit is established for emitter-base current flow through both transistors 70 and 80 from point of reference potential 5 through the parallel combination of emitter resistors 88 and 89, the emitter-base electrodes of respective transistors 70 and 80 and respective leads 90 and 91, lead 92, resistor 85, leads 48 and 49, stationary contact 38 and movable contact 37 of switch 34 to the negative polarity terminal of direct current potential source 8. As the circuit including series resistors 84 and 85, previously described, provides a constant bias potential which is applied across the emitter-base electrodes of both transistors 70 and 80 in parallel, the emitter-base current and, consequently, the emitter-collector current through these transistors remains substantially constant. The constant emitter-collector current through transistor 70 provides a minimum charge current in the second direction for timing capacitor 15 from point of reference or ground potential 5 through emitter resistor 88, the emitter-collector electrodes of transistor 70, lead 97, capacitor 15, diode 67, leads 68 and 24, the collector-emitter electrodes of transistor 20 while conducting, leads 47, 48 and 49 and stationary contact 38 and movable contact 37 to the negative polarity terminal of direct current potential source 8 and the constant emitter-collector current through transistor 80 provides a minimum charge current in the second direction for timing capacitor 25 and from point of reference or ground potential 5 through emitter resistor 89, the emitter-collector electrodes of transistor 80, lead 98, timing capacitor 25, diode 77, leads 78 and 14, the collector-emitter electrodes of transistor 10 while conducting, leads 47, 48 and 49 and stationary contact 38 and movable contact 37 to the negative polarity terminal of direct current potential source 8.

The value of resistor 84 is selected, relative to the value of transistor 85, to produce emitter-base current flow through transistors 70 and 80 in parallel which will produce an emitter-collector current flow therethrough which will provide a preselected minimum output frequency.

To compensate for frequency drift as a result of temperature change or as a result of change of demand with any selected direct current control potential magnitude, a direct current compensating potential may be applied across input circuit terminals 4 and 7 and input resistor 3. For purposes of describing the operation of this feature and without intention or inference of a limitation thereto, it will be assumed that source of direct current compensating potential 94 is any one of the well known frequency to voltage converter circuits which provides a direct current potential output of a magnitude proportional to frequency which monitors the output frequency of the oscillator In the event the output frequency should increase, the potential appearing across the positive and negative polarity output terminals 104 and 105, respectively, of source of direct current compensating potential 94 increases in magnitude in a positive direction. This increase in magnitude increases the flow of current through a circuit which may be traced from a positive polarity output terminal 104 of source of direct current compensating potential 94 through leads 64 and 57 common input terminal 4, point of reference potential 5, through the parallel combination of diodes 106 and 107 and leads 58 and 59, input resistor 3, input terminal 7 and lead 93 to the negative polarity output terminal 105 of source of direct current compensating potential 94. As the current flow through this circuit is in a direction opposite to that produced by the direct current control potential, the magnitude of charging current for timing capacitors 15 and 25 is reduced, a condition which reduces the output frequency. In the event of a decrease of output frequency, the current produced by source of direct current compensating potential 94 through the circuit just described will decrease in magnitude. Consequently, the charging current in the second direction produced by the direct current control potential will increase in magnitude, a condition which will increase output frequency.

While specific transistor types and electrical polarities have been set forth in the specification, it is to be specifically understood that alternate transistor devices and compatible electrical polarities may be substituted therefor without departing from the spirit of the invention.

While a preferred embodiment of the present invention has been shown and described, it will be obvious to those skilled in the art that various modification and substitutions may be made without departing from the spirit of the invention which is to be limited only within the scope of the appended claims.

It is claimed:

1. A potential controlled oscillator comprising in combination with a direct current potential source and a source of selectively variable direct current control potential, first and second timing capacitors, first and second alternately conductive transistors each corresponding to a respective one of said first and second timing capacitors and each having two current carrying electrodes connected across said direct current potential source and a control electrode, third and fourth transistors each having a control and two current carrying electrodes, means for connecting each series combination of said current carrying electrodes of one of said third and fourth transistors, one of said timing capacitors and said control electrode and a selected one of said current carrying electrodes of the corresponding one of said first and second transistors in parallel across said direct current potential source, fifth and sixth transistors each having a control and two current carrying electrodes, means for applying said selectively variable direct current control potential across each series combination of said current carrying electrodes of one of said fifth and sixth transistors, one of said timing capacitors and said current carrying electrodes of the other one of said first and second transistors for charging the respective one of said timing capacitors in a second direction while the other one of said first and second transistors is conducting through said current carrying electrodes thereof, means for applying at least a portion of said selectively variable direct current control potential in a forward polarity relationship across said control electrode and a selected one of said current carrying electrodes of the one of said first and second transistors which corresponds to the said timing capacitor being charged in said second direction when said timing capacitor has become charged, and means for applying said selectively variable direct current control potential in a forward polarity relationship across said control electrode and a selected one of said current carrying electrodes of both of said fifth and sixth transistors in parallel.

2. A potential controlled oscillator comprising in combination with a direct current potential source and a source of selectively variable direct current control potential, first and second timing capacitors, first and second alternately conductive transistors each corresponding to a respective one of said first and second timing capacitors and each having two current carrying electrodes connected across said direct current potential source and a control electrode, third and fourth transistors each having a control and two current carrying electrodes, means for connecting each series combination of said current carrying electrodes of one of said third and fourth transistors, one of said timing capacitors and said control electrode and a selected one of said current carrying electrodes of the corresponding one of said first and second transistors in parallel across said direct current potential source, fifth and sixth transistors each having a control and two current carrying electrodes, means for applying said selectively variable direct current control potential across each series combination of said current carrying electrodes of one of said fifth and sixth transistors, one of said timing capacitors and said current carrying electrodes of the other one of said first and second transistors for charging the respective one of said timing capacitors in a second direction while the other one of said first and second transistors is conducting through said current carrying electrodes thereof, means for applying at least a portion of said selectively variable direct current control potential in a forward polarity relationship across said control electrode and a selected one of said current carrying electrodes of the one of said first and second transistors which corresponds to the said timing capacitor being charged in said second direction when said timing capacitor has become charged, means for applying said selectively variable direct current control potential in a forward polarity relationship across said control electrode and a selected one of said current carrying electrodes of both of said fifth and sixth transistors in parallel, seventh and eighth transistors each having a control and two current carrying electrodes, means for producing a constant bias potential, means for applying said constant bias potential in a forward polarity relationship across said control electrode and a selected one of said current carrying electrodes of both of said seventh and eighth transistors in parallel, and means for connecting said current carrying electrodes of each one of said seventh and eighth transistors in parallel with said current carrying electrodes of a respective one of said fifth and sixth transistors.

3. A potential controlled oscillator comprising in combination with a direct current potential source, first and second timing capacitors, first and second alternately conductive transistors each corresponding to a respective one of said first and second timing capacitors and each having two current carrying electrodes and a control electrode, means for connecting said current carrying electrodes of said first and second transistors in parallel across said direct current potential source, third and fourth transistors each having a control and two current carrying electrodes, means for connecting each series combination of said current carrying electrodes of one of said third and fourth transistors, one of said timing capacitors and said control electrode and a selected one of said current carrying electrodes of the corresponding one of said first and second transistors in parallel across said direct current potential source, fifth and sixth transistors each having a control and two current carrying electrodes, input circuit means across which a selectively variable direct current control potential may be applied, means for connecting each series combination of said current carrying electrodes of one of said fifth and sixth transistors, one of said timing capacitors and said current carrying electrodes of the other one of said first and second transistors in parallel across said input circuit means, means for connecting said control electrode of each one of said first and second transistors to the junction between the said timing capacitor to which it corresponds and the said current carrying electrodes of the said one of said fifth and sixth transistors with which it is connected in series, and means for connecting said control electrode and a selected one of said current carrying electrodes of both of said fifth and sixth transistors in parallel across said input circuit means.

4. A potential controlled oscillator comprising in combination with a direct current potential source, first and second timing capacitors, first and second alternately conductive transistors each corresponding to a respective one of said first and second timing capacitors and each having two current carrying electrodes and a control electrode, means for connecting said current carrying electrodes of said first and second transistors in parallel across said direct current potential source, third and fourth transistors each having a control and two current carrying electrodes, means for connecting each series combination of said current carrying electrodes of one of said third and fourth transistors, one of said timing capacitors and said control electrode and a selected one of said current carrying electrodes of the corresponding one of said first and second transistors in parallel across said direct current potential source, fifth and sixth transistors each having a control and two current carrying electrodes, input circuit means across which a selectively variable direct current control potential may be applied, means for connecting each series combination of said current carrying electrodes of one of said fifth and sixth transistors, one of said timing capacitors and said current carrying electrodes of the other one of said first and second transistors in parallel across said input circuit means, means for connecting said control electrode of each one of said first and second transistors to the junction between the said timing capacitor to which it corresponds and the said current carrying electrodes of the said one of said fifth and sixth transistors with which it is connected in series, means for connecting said control electrode and a selected one of said current carrying electrodes of both of said fifth and sixth transistors in parallel across said input circuit means, seventh and eighth transistors each having a control and two current carrying electrodes, means for producing a constant bias potential, means for applying said constant bias potential in a forward polarity relationship across said control electrode and a selected one of said current carrying electrodes of both of said seventh and eighth transistors in parallel, and means for connecting said current carrying electrodes of each one of said seventh and eighth transistors in parallel with said current carrying electrodes of a respective one of said fifth and sixth transistors.

5. A potential controlled oscillator comprising in combination with a direct current potential source, first and second timing capacitors, first and second alternately conductive transistors each corresponding to a respective one of said first and second timing capacitors and each having two current carrying electrodes and a control electrode, means for connecting said current carrying electrodes of said first and second transistors in parallel across said output terminals of said direct current potential source, third and fourth transistors each having a control and two current carrying electrodes, means for connecting each series combination of said current carrying electrodes of one of said third and fourth transistors, one of said timing capacitors and said control electrode and a selected one of said current carrying electrodes of the corresponding one of said first and second transistors in parallel across said output terminals of said direct current potential source, fifth and sixth transistors each having a control and two current carrying electrodes, a common input circuit means connected to said point of reference potential, a first input circuit means across which and said common input circuit means a selectively variable direct current control potential may be applied, a second input circuit means across which and said common input circuit means a direct current compensating potential may be applied, means for connecting each series combination of said current carrying electrodes of one of said fifth and sixth transistors, one of said timing capacitors and said current carrying electrodes of the other one of said first and second transistors across said first and said common input circuit means, means for connecting said control electrode of each one of said first and second transistors to the junction between the said timing capacitor to which it corresponds and the said current carrying electrodes of the said one of said fifth and sixth transistors with which it is connected in series, means for connecting said control electrode and a selected one of said current carrying electrodes of both of said fifth and sixth transistors across said first and said common input circuit means, seventh and eighth transistors each having a control and two current carrying electrodes, means for producing a constant bias potential, means for applying said constant bias potential in a forward polarity relationship across said control electrode and a selected one of said current carrying electrodes of both of said seventh and eighth transistors in parallel, and means for connecting said current carrying electrodes of each one of said seventh and eighth transistors in parallel with said current carrying electrodes of a respective one of said fifth and sixth transistors.

6. A potential controlled oscillator comprising in combination with a direct current potential source of the type having positive and negative polarity output terminals with respect to a point of reference potential and a source of variable direct current control potential, first and second timing capacitors, first and second alternately conductive type NPN transistors each corresponding to a respective one of said first and second timing capacitors and each having collector, emitter and base electrodes, means for connecting said collector-emitter electrodes of said first and second transistors in parallel across said output terminals of said direct current potential source, third and fourth type PNP transistors each having emitter, collector and base electrodes, means for connecting each series combination of said emitter-collector electrodes of one of said third and fourth transistors, one of said timing capacitors and said base-emitter electrodes of the corresponding one of said first and second transistors in that order in parallel across said output terminals of said direct current potential source, fifth and sixth type PNP transistors each having emitter, collector and base electrodes, a common input circuit means connected to said point of reference potential, a first input circuit means across which and said common input circuit means a selectively variable direct current control potential may be applied, a second input circuit means across which and said common input circuit means a direct current compensating potential may be applied, means for connecting each series combination of said emitter-collector electrodes of one of said fifth and sixth transistors, one of said timing capacitors and said collector-emitter electrodes of the other one of said first and second transistors across said first input circuit means and said negative polarity terminal of said direct current potential source, means for connecting said base electrode of each one of said first and second transistors to the junction between the said timing capacitor to which it corresponds and the said collector electrode of the said one of said fifth and sixth transistors with which it is connected in series, means for connecting said base-emitter electrodes of both of said fifth and sixth transistors in parallel across said first and said common input circuit means, seventh and eighth type PNP transistors each having emitter, collector and base electrodes, third and fourth resistors, means for connecting said third and fourth resistors in series across said point of reference potential and said negative polarity terminal of said direct current potential source, means for connecting said base electrodes of said seventh and eighth transistors to a point between said third and fourth series connected resistors, means for connecting said emitter electrodes of said seventh and eighth transistors to said point of reference potential, and means for connecting said emitter-collector electrodes of each one of said seventh and eighth transistors in parallel with said emitter-collector electrodes of a respective one of said fifth and sixth transistors.

* * * * *